Sept. 10, 1940.  D. H. HILL  2,214,462
OPERATING DEVICE FOR POULTRY DROPPINGS BELT
Filed Dec. 7, 1939
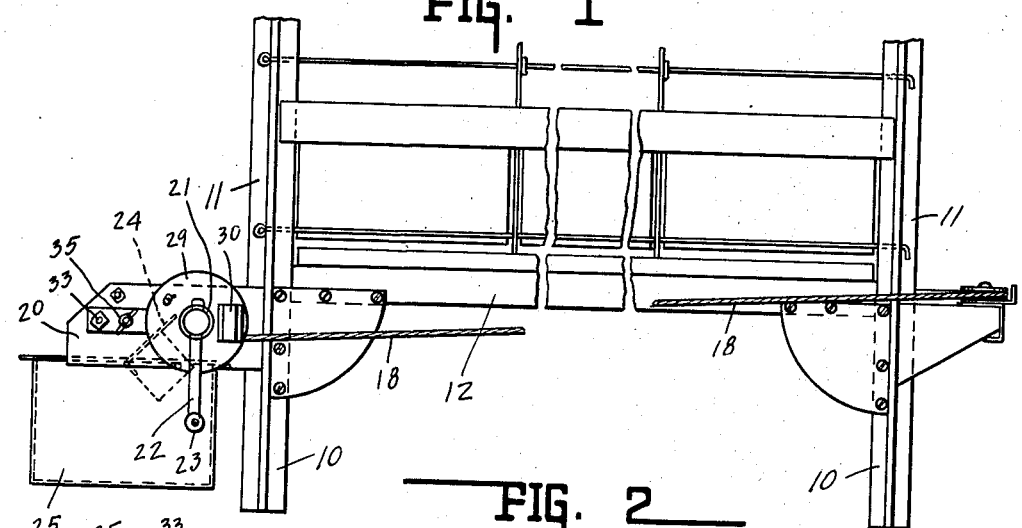
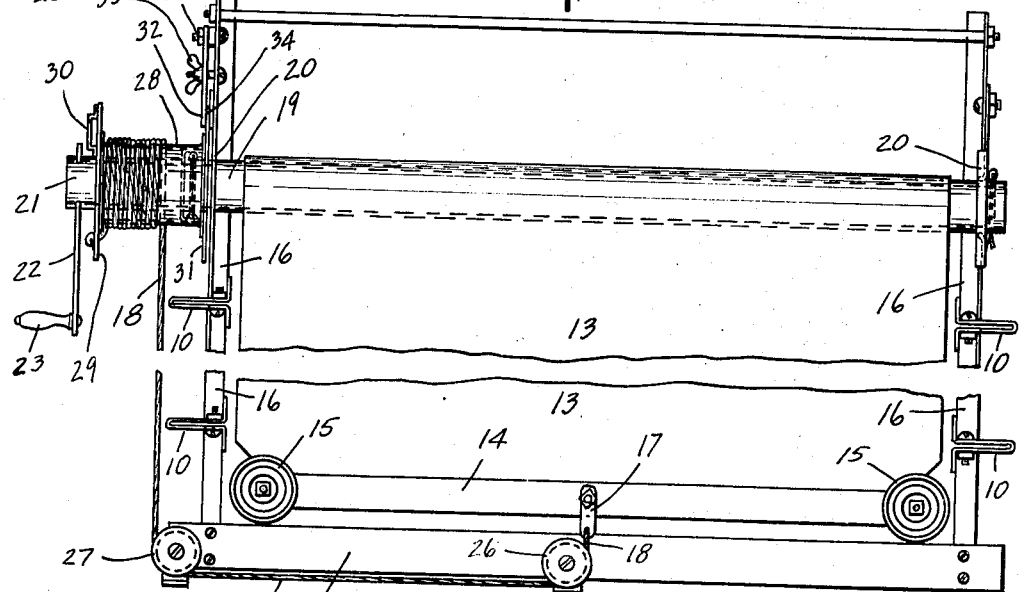
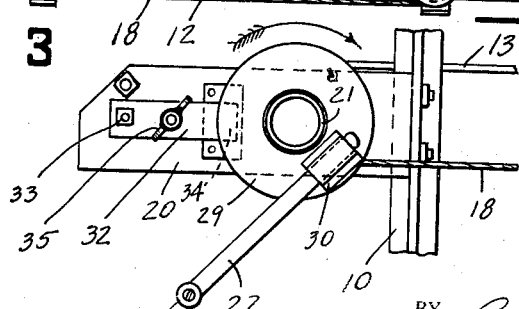
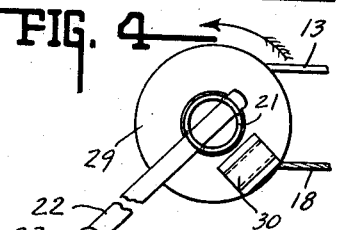
INVENTOR.
DEWEY H. HILL.
BY Lockwood, Goldsmith & Galt
ATTORNEYS.

Patented Sept. 10, 1940

2,214,462

UNITED STATES PATENT OFFICE 2,214,462

OPERATING DEVICE FOR POULTRY DROPPINGS BELT

Dewey H. Hill, Macomb, Ill., assignor to Globe American Corporation, Macomb, Ill., a corporation Application December 7, 1939, Serial No. 308,029

2 Claims. (Cl. 119—17)

This invention relates to an operating device for poultry droppings belt and particularly a manually operated means for rolling up and unrolling the belt for cleansing purposes.

It is common practice to provide a poultry cage with a flexible belt immediately under the open bottom thereof to catch the droppings of the poultry. Where the cages are provided in batteries or tiers, one upon the other, a series of such belts is provided, one under each cage or tier of cages. Said belts may be in the form of a continuous belt supported by rollers at each end or may comprise a single belt extending the length of the cage adapted to be rolled upon a drum at one end for cleansing purposes and unrolled from the drum to operative position through the medium of a cable attached to its free end. In the latter type it has been found desirable to provide manual means at one end of the cage for operating the drum to roll up the belt in one operation, and adjacent the same to provide operating means for unrolling the belt so that it is unnecessary for the operator to move from one end of the cage to the other to effect the two operations.

This invention is directed toward this feature for providing a simple and effective means of rolling and unrolling the belt from the same location. This is accomplished by providing a single removable crank which may be inserted in an extension of the drum for rotating it to roll the belt thereon, but which may be removed from the drum and inserted in a sleeve freely mounted for rotation upon the drum extension about which the cable is wound, there being suitable pulleys for directing the cable and a friction brake for preventing the drum and sleeve from overrunning or spinning.

Other objects and features of the invention will be understood from the accompanying drawing and the following description and claims:

Fig. 1 is a side elevation of a poultry cage illustrating the relation thereto of the droppings belt, cable and drums. Fig. 2 is a plan view of that portion of the cage, with parts broken away, showing the mounting and operating device for the droppings belt. Fig. 3 is a side elevation of the operating device arranged for unrolling the belt. Fig. 4 is the same as Fig. 3 showing the position of the operating device for rolling up the belt.

In the drawing there is illustrated a poultry cage supported by legs 10 and having a framework including uprights 11 and cross frame members 12.

The usual cage structure is supported by said frame members to enclose the walls of the cage and provide a bottom and top structure therefor of the usual character. Below the bottom wall or floor of the cage, which is usually of open mesh screen, there is provided a droppings belt 13 adapted to extend when in use throughout the length and width of the cage. The free end of said belt is provided with a rigid cross brace 14 having belt guide disks 15 at each end thereof adapted to maintain the proper directional movement of the belt between the side rails 16 when operating. Centrally of the brace 14 there is a pivoted link 17 to which the cable 18 is secured. The other end of the belt is secured to the roller drum 19 upon which the belt is adapted to be wound when the drum is rotated.

The drum 19 is rotatably supported at each end thereof between roller brackets 20 which are mounted forwardly of the cage and secured to the forward legs 10. Longitudinal sliding movement of the drum may be prevented by keys or cotter pins adjacent the outer surface of the bracket 20, but one end of said drum is provided with an extension indicated at 21 protruding substantially beyond one of said brackets. The extension 21 of the drum 19 is provided with diametrically aligned apertures therethrough adjacent its free end through which a crank arm 22 may be removably extended, said crank arm being provided with an operating handle 23 as shown in Figs. 2 and 4. By operating the crank arm when extending through the aperture in the drum extension 21 said drum may be readily rotated against suitable frictional resistance to wind the belt thereon. As the belt is wound thereon a yielding scraper indicated at 24 in Fig. 1 engages and scrapes the surface of the belt free from the droppings which fall into the waste box 25.

The cable 18 passes about a pulley 26 pivoted to rotate horizontally upon the cross frame member 12 at the opposite end of the cage from the drum. The cable extends about the corner pulley 27 similarly mounted and thence to the flanged sleeve 28 about which it is wound. The sleeve 28 is freely rotatable upon the extension 21 of the drum 19 and is provided at each end with peripherally extending flanges 29 and 31. The outer flange 29 is provided with a socket 30 adapted to removably receive the crank arm as shown in Fig. 3.

Overlapping the inner flange 31 there is provided a friction element in the form of a spring plate 32 anchored to the bracket 20 at one end as indicated at 33. Its overlapping end is provided with a friction surface indicated at 34 adapted to frictionally bear against flange 31 through the spring tension thereof effected by the wing nut 35.

In operation, the belt 13, which may be of rubberized fabric or other suitable material, is wound upon the drum 19, which may be in the form of a hollow steel shaft, by inserting the crank arm 22 through the diametrically opposed apertures in said shaft and rotating it in the proper direction. As the belt is thus wound upon the drum the scraper 24 removes the droppings to the box 25, by its engagement with the belt during this operation. As the belt is rolled upon the drum, the cable 18 is unwound from about the sleeve 28 which is thereby caused to rotate against the friction of plate 34. In this manner overrunning of the sleeve is prevented, and the belt and cable are maintained taut.

After the rolling and cleaning of the belt and for returning it to operative position, the crank arm 22 is removed from the drum extension 21 and inserted in the socket 30 of the sleeve 28. Said sleeve is then rotated about the drum extension 21 to wind the cable thereabout and withdraw the belt from about the drum until it is returned to its position coextensive with the bottom of the cage.

From the foregoing, it will be observed that through the medium of a hollow shaft providing the drum 19 and its extension 21, and with the freely rotatable sleeve 28 and single crank arm 22, complete and effective operation of the belt may be conducted from the one location of the cage. By reason of the rotative freedom between the drum and sleeve variations in their relative rate of rotation due to increased diameter of the rolled belt, need not be otherwise compensated for.

The invention claimed is:

1. In a poultry cage, a droppings belt, a winding drum for said belt rotatably supported at one end of the cage, an operating cable connected with the free end of said belt and passing about a pulley at the other end of the cage to extend towards said drum, an operating extension on said drum, a sleeve rotatably mounted on said extension about which said cable is wound and a single winding crank selectively applicable to said drum or sleeve for winding one independently of the other.

2. An operating device for a poultry cage droppings belt comprising a belt winding drum having an extension thereon, an operating cable connected with the free end of said belt, a winding sleeve for said cable freely mounted for rotation on said extension, said sleeve and extension having independent crank receiving sockets thereon, and an operating crank selectively insertable in one or the other of said sockets to effect the winding or unwinding of said belt.

DEWEY H. HILL.